United States Patent [19]

Schwaegerle

[11] Patent Number: 4,741,506

[45] Date of Patent: May 3, 1988

[54] MOVEABLE BASE SUPPORT FOR AN EXAMINATION/TREATMENT CHAIR

[75] Inventor: Gary G. Schwaegerle, Cincinnati, Ohio

[73] Assignee: F & F Koenigkramer, Inc., Cincinnati, Ohio

[21] Appl. No.: 75,359

[22] Filed: Jul. 20, 1987

[51] Int. Cl.[4] .............................................. F16M 13/00

[52] U.S. Cl. ..................................... 248/430; 297/346

[58] Field of Search ............... 248/424, 429, 430, 425, 248/657, 662, 419, 420; 297/346; 296/65 R; 108/20; 211/162

[56] References Cited

U.S. PATENT DOCUMENTS

| | | | |
|---|---|---|---|
| 1,701,044 | 2/1929 | Knaur et al. . | |
| 1,838,199 | 12/1931 | Thomas . | |
| 2,041,648 | 5/1936 | Pepper | 248/430 X |
| 2,324,207 | 7/1943 | Gsell . | |
| 2,553,652 | 5/1951 | Gradle et al. . | |
| 2,742,952 | 4/1956 | Bellamy | 248/430 |
| 3,259,355 | 7/1966 | Slouka . | |
| 3,357,740 | 12/1967 | Vaughn et al. . | |
| 3,486,728 | 12/1969 | Naughton . | |
| 3,572,680 | 3/1971 | Neff . | |
| 3,702,179 | 11/1972 | Radke et al. . | |
| 3,848,937 | 11/1974 | Harder, Jr. . | |
| 3,993,280 | 11/1976 | Surbaugh | 248/430 X |
| 4,168,050 | 9/1979 | Nerem | 248/430 X |
| 4,213,464 | 7/1980 | Katz | 248/430 X |
| 4,226,191 | 10/1980 | Espana | 108/20 |
| 4,432,525 | 2/1984 | Duvall | 248/430 |
| 4,560,200 | 12/1985 | Giannelli et al. . | |
| 4,563,044 | 1/1976 | Rees | 296/65 R |
| 4,571,799 | 2/1986 | Chitayat | 248/424 X |
| 4,600,239 | 7/1986 | Gerstein | 296/65 R |

*Primary Examiner*—J. Franklin Foss

*Attorney, Agent, or Firm*—Wood, Herron & Evans

[57] ABSTRACT

A base support for an examination/treatment chair permits lateral movement of the chair relative to a support for medical instruments and comprises a top plate laterally movable on wheel assemblies relative to a fixed bottom plate. A locking assembly interposed between the top and bottom plates includes a foot operated pivot arm which mounts a locking pin movable within a guide bore formed in the top plate and into a selected aperture formed in the bottom plate to adjust the position of the top plate, and in turn, the chair, relative to the bottom plate.

7 Claims, 2 Drawing Sheets

MOVEABLE BASE SUPPORT FOR AN EXAMINATION/TREATMENT CHAIR

FIELD OF THE INVENTION

This invention relates to equipment used by ophthalmologists or other physicians, and, more particularly, to a base support for an examination/treatment chair which permits adjustment of the position of a patient relative to ophthalmic instruments used in an examination.

BACKGROUND OF THE INVENTION

In the past, it was common practice for ophthalmologists to arrange different instruments and examination chairs or stools at different locations in an office or operatory. This practice required that both the doctor and patient move from location to location which interrupted the examination and caused needless delays.

In an effort to shorten the examination time and increase efficiency, instrument support equipment has been designed to enable both the patient and doctor to remain in the same location while the instrumentation is moved into position as needed. This has been accomplished in the prior art by mounting a number of different instruments on a post carried by a base, e.g., U.S. Pat. Nos. 1,494,666 to Clement and 2,149,141 to Hunsicker, and/or mounting the instruments to a movable arm assembly which is positionable between the doctor and patient, e.g., U.S. Pat. Nos. 3,201,795 to Cuppers et al and 3,572,913 to Korh et al.

More recent designs of supports for ophthalmic examination instruments include a cabinet base which supports a post carrying a number of instruments, and a separate horizontal table mounted to the cabinet which is positionable over the lap of the patient seated upon a chair. The horizontal table mounts a number of instruments and is extensible relative to the supporting cabinet and the patient to position the desired instrument near the patient as required during the examination. See, for example, U.S. Pat. Nos. 4,421,394 to Schon et al and 4,643,547 to Collins et al.

In the ophthalmic instrument supports of the type described in the patents to Schon et al and Collins et al, for example, the ophthalmological chairs which support the patient can be raised and lowered to align the patient with the instruments on the horizontal table portion of the support. No provision is made in such supports, however, to readily adjust the lateral position of the chair and patient with respect to the horizontal table. Depending upon the size of the patient, it may be necessary to move the chair laterally toward or away from the horizontal table in order to properly align the patient with the ophthalmic instrumentation.

Lateral movement of ophthalmological chairs has been obtained in the prior art by mounting the chair to an adjustable base support. Such base supports include a top plate which mounts the chair, and a bottom plate upon which the top plate is laterally movable. Although capable of adjusting the position of an ophthalmological chair, such prior art base supports have not been designed to mount relatively heavy chairs and are not effective to securely lock the top plate relative to the bottom plate once the position of the chair has been adjusted.

SUMMARY OF THE INVENTION

It is therefore among the objectives of this invention to provide a base support for an examination/treatment chair which is capable of supporting heavy chairs without failure and which positively locks the chair in a number of adjusted positions.

These objectives are accomplished in a base support for an examination/treatment chair which comprises a top plate movable on wheels atop a bottom plate along a pair of heavy duty stainless steel tracks mounted at the sides of the lower plate. A locking assembly including a pin is pivotal by operation of a foot pedal between an unlocked position to permit movement of the top plate relative to the bottom plate, and a locked position wherein the pin is guided within a selected aperture formed in the lower plate to secure the top plate in the desired position relative to the bottom plate.

In the presently preferred embodiment, the base support comprises a bottom plate having opposed sides, opposed ends and a top surface. A pair of tracks in the form of stainless steel strips are mounted to the top surface of the bottom plate adjacent each side thereof. Two pairs of guide rollers are mounted at the center of the bottom plate with the rollers in each pair being spaced from one another. Preferably, at least four apertures are formed along a straight line in the bottom plate with a space of about 2" between adjacent apertures.

The bottom plate is adapted to support a top plate which comprises opposed sides, opposed ends and a bottom surface which faces the top surface of the bottom plate. A wheel assembly is mounted to the bottom surface of the top plate at each of its four corners. Each wheel assembly has a wheel or roller which rides atop the stainless steel tracks mounted on the bottom plate. A guide slat or plate is mounted at the center of the bottom surface of the top plate which is received between the rollers of each guide roller pair mounted on the bottom plate. Engagement of the guide plate with the guide rollers insures that the top plate travels in a straight path along the bottom plate without angling or cocking in one direction or another.

A locking assembly is provided to interconnect the top plate to the bottom plate at selected locations therealong. The locking assembly comprises a mounting block carried by the upper plate which supports a pivot arm pinned thereto. One end of the pivot arm mounts a locking pin and the opposite end thereof mounts a foot operated knob. A cover plate is mounted in the top plate above the pivot arm and is formed with a guide bore which receives one end of the locking pin. The opposite end of the locking pin is extendible into engagement with each of the apertures formed in the bottom plate.

In order to adjust the position of the top plate with respect to the bottom plate, the knob is depressed and moved toward the bottom plate, e.g., by one's foot, which pivots the pivot arm to raise the locking pin toward the top plate so that its lower end disengages an aperture in the bottom plate. The top plate can then be moved laterally with respect to the bottom plate as described above. When the top plate is moved to the desired position, the knob is released and a return spring carried by the locking pin forces the pivot arm downwardly toward the bottom plate which guides the lower end of the locking pin into one of the apertures formed in the bottom plate. This positively locks the top plate in position relative to the bottom plate.

The upper end of the locking pin is constantly retained within the guide bore formed in the cover plate of the locking assembly regardless of the position of the pivot arm. This effectively guides the pivotal motion of the locking pin to insure that its lower end enters a selected aperture formed in the bottom plate. As a result, the bottom end of the locking pin is cylindrical in shape and need not be tapered to facilitate movement within the apertures of the bottom plate.

In the prior art, the lower end of the locking pin was tapered to accommodate misalignment between the locking pin and apertures in the bottom plate. This resulted in inadvertent disengagement of the locking pin from the aperture allowing relative movement between the top and bottom plates, and, in turn, between the patient sitting in the chair and the instrument support. By eliminating the taper on the lower end of the locking pin herein, the chance of disengagement of the locking pin and any of the apertures in the bottom plate is substantially reduced. The top plate is therefore effectively locked in position relative to the bottom plate at any desired location therealong.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
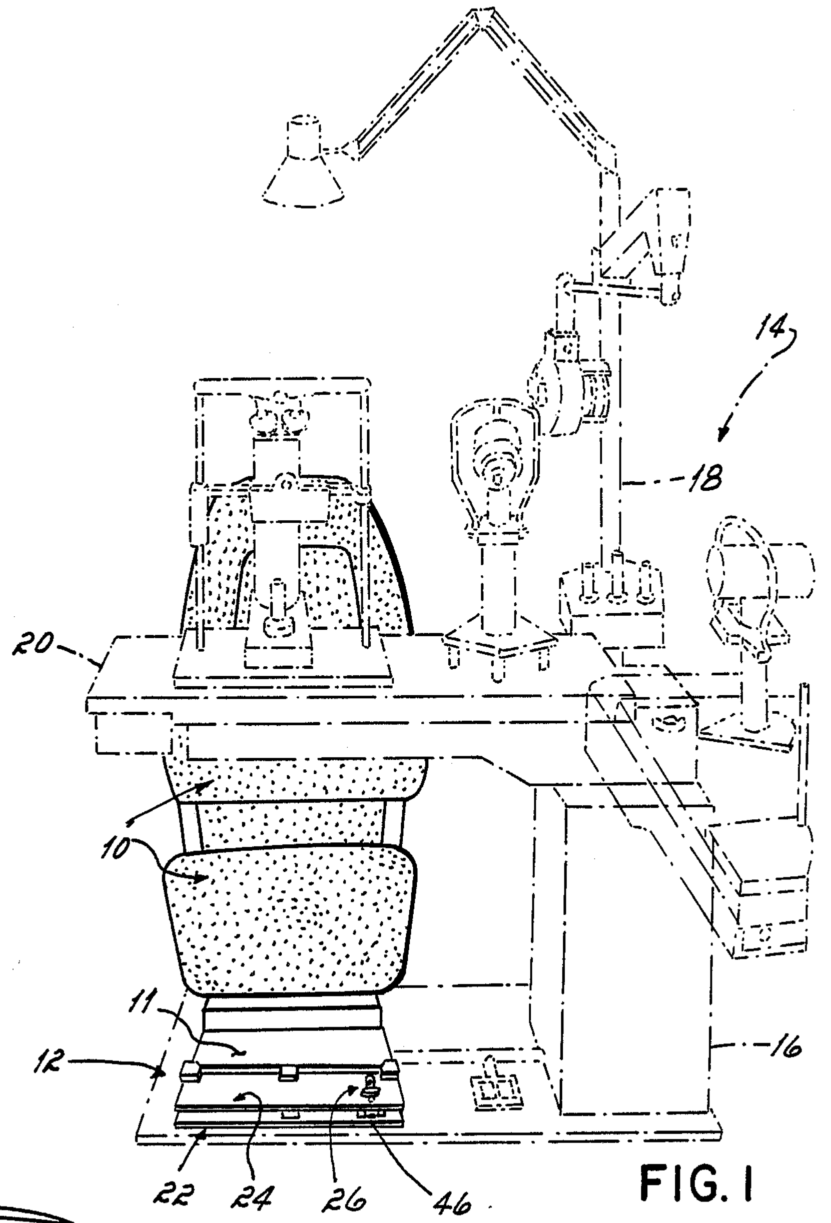
FIG. 1 is a schematic perspective view of an ophthalmological chair mounted upon the base support herein with one type of an ophthalmic instrument support illustrated in phantom in position relative to the chair.

Referring now to FIG. 1, an ophthalmological chair 10 is mounted upon a base support 12 in position relative to an ophthalmic instrument support 14. As illustrated in phantom in FIG. 1, the instrument support 14 includes a cabinet 16 which mounts a post 18 carrying a number of ophthalmic instruments and a horizontal table 20 which extends to the chair 10 and carries other instruments. Ophthalmic instrument supports 14 of the type illustrated herein are shown, for example, in U.S. Pat. No. 4,643,547. The support 14 forms no part of this invention per se and reference should be made to the '547 for a detailed discussion thereof.

The base support 12 is effective to adjust the lateral position of the chair 10, i.e., toward and away from the horizontal table 20 of the instrument support 14. The base support 12 comprises a bottom plate 22, a top plate 24 and a locking assembly 26.

Figure 2:
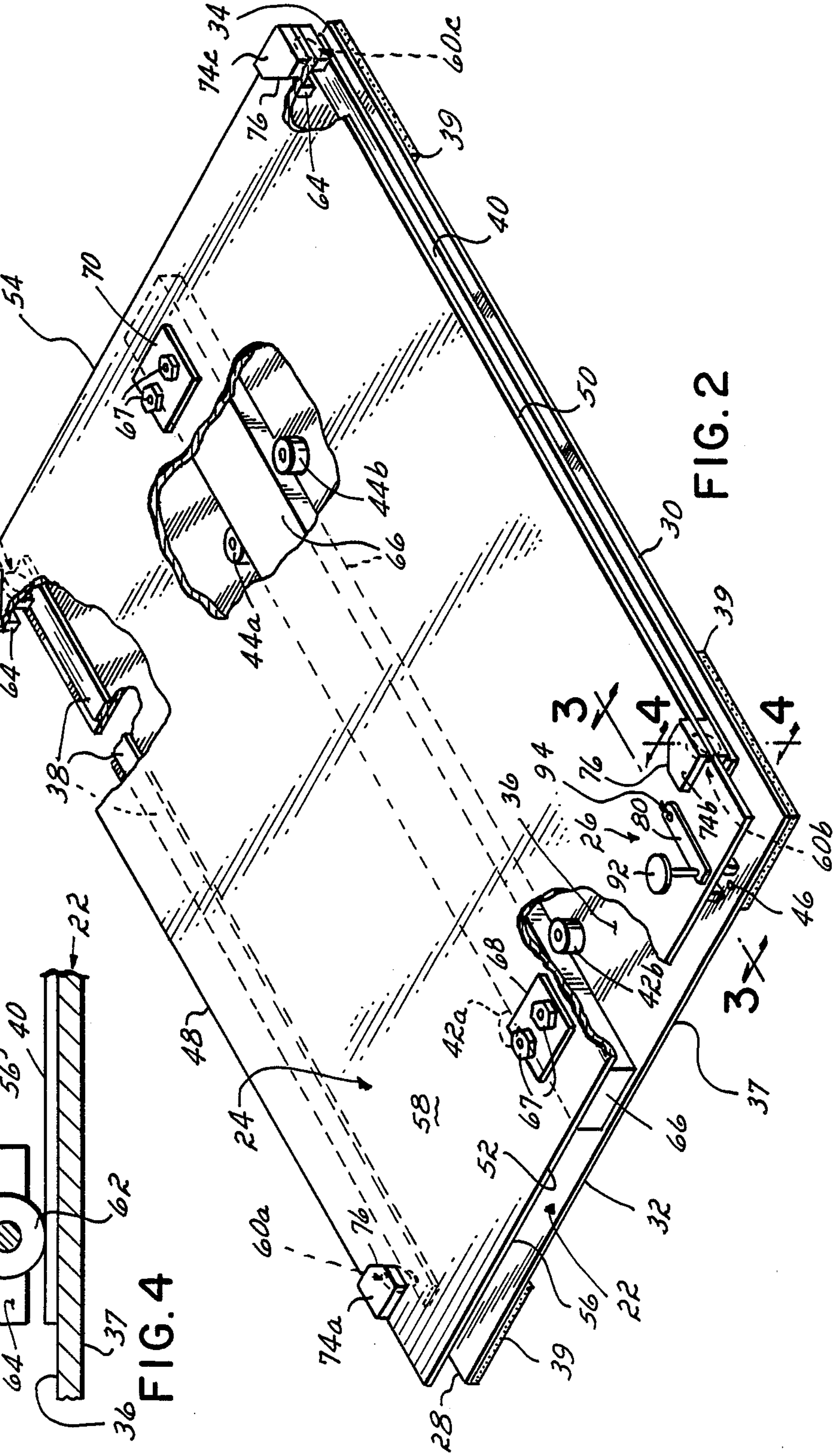
FIG. 2 is a schematic perspective view of the base support herein with cut away portions to show various features thereof.
Figure 4:
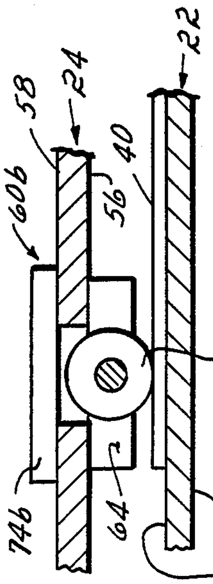
FIG. 4 is a cross sectional view taken generally along line 4—4 of FIG. 2 showing a wheel assembly herein.

Referring now to FIGS. 2 and 4, the bottom plate 22 includes opposed sides 28, 30, opposed ends 32, 34, a top surface 36 and a bottom surface 37. The bottom plate 22 is supported at each of its four corners by friction blocks 39 mounted to the bottom surface 37 thereof. A pair of stainless steels tracks 38, 40 in the form of strips or slats are mounted to the top surface 36 of bottom plate 22 immediately adjacent the sides 28, 30, respectively. Two pairs of guide rollers 42*a*, *b* and 44*a*, *b* are mounted to the top surface 36 of bottom plate 22 at approximately the longitudinal center thereof. The rollers 42*a*, *b* are spaced from one another and mounted near the end 32 of bottom plate 22, and the rollers 44*a*, *b* are mounted in alignment with the rollers 42*a*, *b* near the opposite end 34 of bottom plate 22.

In the presently preferred embodiment, the bottom plate 22 is formed with a number of apertures 46 which extend in a straight line therealong at approximately 2" intervals. In the embodiment illustrated in the Figs., the apertures 46 are located at the corner of the bottom plate 22 formed by the intersection of side 30 and end 32.

The top plate 24 is adapted to rest atop the bottom plate 22 and move laterally, i.e., end for end, relative to the bottom plate 22. The top plate 24 is formed with opposed sides 48, 50, opposed ends 52, 54, a bottom surface 56 and a top surface 58. Wheel assemblies 60*a–d* are mounted at each of the four corners of the top plate 24 to its bottom surface 56. As shown in FIG. 4, each of the wheel assemblies 60*a–d* comprises a wheel or roller 62 carried by a wheel block 64 mounted to the top plate 24. The wheel assemblies 60*a*, *d* are movable along the track 38, and wheel assemblies 60*b*, *c* are movable along track 40 to shift the position of top plate 24 with respect to bottom plate 22.

A guide plate 66 is mounted to the bottom surface 56 of the top plate 24 by bolts or screws 67 extending through locator blocks 68, 70, such that the guide plate 66 is received between the rollers 42*a*, *b* at one end of the bottom plate 22 and rollers 44*a*, *b* mounted at the opposite end of bottom plate 22. The guide plate 66 functions to maintain the position of the top plate 24 relative to the bottom plate 22 so that the top plate 24 does not become angled or cocked relative to the bottom plate 22 as it moves therealong.

In the presently preferred embodiment, each of the wheel assemblies 60*a–d* is covered by a locator plate 74*a–d*, respectively, which are mounted to the top surface 58 of top plate 24. The locator plate 74*a–d* have a dual purpose. First, locator plates 74*a–d* protect the wheel assemblies 60*a–d* from dust, dirt or any other foreign objects which could interfere with their operation. Additionally, the locator plates 74*a–d* are each formed with an angled inner edge 76 against which the rectangular base 11 of the ophthalmological chair 10 rests when in position atop the top plate 24. See FIG. 1. This helps locate the chair 10 in the proper position upon the top plate 24 so as not to damage the chair 10 or base support 12.

Figure 3:
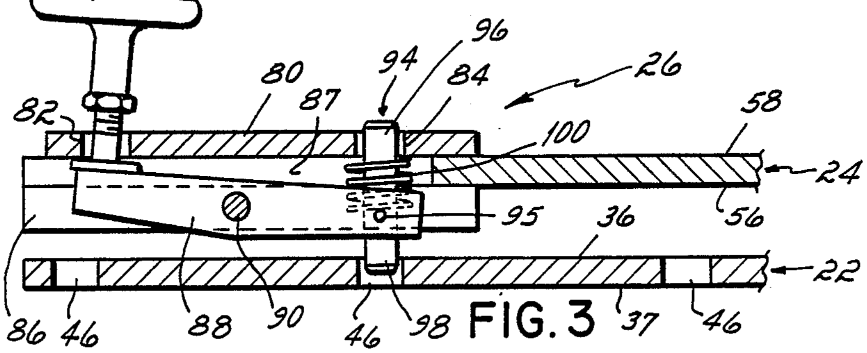
FIG. 3 is a cross sectional view taken generally along line 3—3 of FIG. 2 showing the locking assembly of this invention.

Referring now to FIGS. 2 and 3, the locking assembly 26 of base support 12 is provided to permit adjustment of the position of the top plate 24 relative to the bottom plate 22 so that the chair 10 can be properly located relative to the horizontal table 20 of instrument support 14. The locking assembly 26 includes a cover plate 80 formed with an through bore 82 and a guide bore 84. The cover plate 80 is mounted to the top surface 58 of top plate 24 above the apertures 46 formed in the bottom plate 22. A mounting block 86 is affixed to the bottom surface 56 of the top plate 24 beneath an access opening 87 formed therein. A pivot arm 88 is mounted by a pin 90 to the mounting block 86 and is positioned between the cover plate 80 and bottom plate 22 as shown in FIG. 3. One end of the pivot arm 88 mounts a knob 92, and a locking pin 94 is mounted by a pin 95 to the opposite end of the pivot arm 88.

As illustrated in FIG. 3, the locking pin 94 has an upper end 96 which is captured within the guide bore 84 and the cover plate 80. The cylindrical shaped, lower end 98 of locking pin 94 is adapted to be received within each of the apertures 46 in the bottom plate 22. A return spring 100 is carried on the locking pin 94, and is interposed between the bottom of the cover plate 80 and the pivot arm 88.

In the position of locking assembly 26 illustrated in FIG. 3, the lower end 98 of the locking pin 94 extends within an aperture 46 in the bottom plate 22 and is maintained therein by the return spring 100. In this position of locking pin 94, the top plate 24 is fixed relative to the bottom plate 22 so as to prevent inadvertent movement of the chair 10 toward and away from the ophthalmic instrument support 14.

In order to adjust the position of the top plate 24 relative to the bottom plate 22, and, in turn, the position of chair 10 relative to support 14, the knob 92 is depressed such as by the foot of the attending ophthalmologist. This pivots the knob end of the pivot arm 88 downwardly toward the bottom plate 22, which, in turn, raises the opposite end of the pivot arm 88 upwardly toward the top plate 24. The locking pin 94 is thus carried upwardly with the pivot arm 88 so that its lower end 98 disengages the aperture 46 of the bottom plate 22. With the knob 92 held downwardly by the foot, the top plate 24 can be pushed forwardly or rearwardly to adjust the position of the examination/treatment chair 10 relative to the instrument support 14. Overtravel of the top plate 24 relative to the bottom plate 22 is prevented by stop blocks 49*a–d* impeding the travel of the wheel block 64. When the chair 10 is in the desired position, the knob 92 is released and the return spring 100 then urges the lower end 98 of the locking pin 94 into a selected aperture 46 of the bottom plate 22.

The upper end 96 of the locking pin 94 is maintained in constant engagement with the guide bore 84 in the cover plate 80 regardless of whether the knob 92 is depressed or in the position shown in FIG. 3. As a result, the movement of the locking pin 94 is controlled or guided into the respective apertures 46 of the bottom plate 22. The lower end 98 of locking pin 94 can therefore be made substantially cylindrical as shown in FIG. 3, without a taper, and this prevents disengagement of the locking pin 94 with the side walls of the apertures 46 in the bottom plate 22.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of this invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A base support for an examination/treatment chair comprising:

a first plate having a top surface, a bottom surface, opposed sides and opposed ends, said first plate being formed with at least two apertures extending along a line from one of said ends toward the other of said ends;

a pair of tracks mounted to said top surface of said first plate, one of said tracks being positioned adjacent each of said opposed sides thereof;

at least two pairs of guide rollers rotatably mounted to said top surface of said first plate approximately midway between said opposed sides thereof, said guide rollers of each pair being laterally spaced relative to one another;

a second plate having a top surface, a bottom surface, opposed ends and opposed sides;

a guide plate mounted to said bottom surface of said second plate approximately midway between said opposed sides thereof;

a wheel assembly mounted to said bottom surface of said second plate at each of the four corners thereof;

said second plate being positionable atop said first plate so that said guide plate of said second plate is received between and axially movable relative to said two pairs of rollers of said first plate, and so that said wheel assemblies of said second plate rest atop and are axially movable along said tracks of said first plate;

a locking assembly connected between said first and second plates, said locking assembly comprising:

(i) a cover plate mounted to said upper surface of said second plate, said cover plate being formed with a guide bore;

(ii) a pivot arm mounted between said first and second plates;

(iii) a locking pin mounted at one end of said pivot arm, said locking pin having one end axially movable within said guide bore of said cover plate and an opposite end axially movable into each of said apertures formed in said first plate;

(iv) means for pivoting said pivot arm to move said locking pin between a first position in which said locking pin extends between said guide bore of said cover plate and one of said apertures in said first plate, and a second position in which said locking pin disengages said aperture in said first plate while remaining within said guide bore in said cover plate, said locking pin being effective in said first position to secure said second plate from movement relative to said first plate and said locking pin being effective in said second position to permit adjustment of the lateral position of said second plate relative to said first plate.

2. The base support of claim 1 in which said means for pivoting said locking pin comprises:

a knob mounted at the end of said pivot arm opposite said locking pin, said knob being operable to pivot said pivot arm for moving said locking pin to said second position;

a return spring connected between said cover plate and said end of said pivot arm which mounts said locking pin, said return spring being effective to pivot said pivot arm and move said locking pin to said first position.

3. The base support of claim 1 in which the examination/treatment chair has a generally rectangular base, said base support including a locator plate mounted to said top surface of said second plate at each corner thereof, said locator plates engaging the corners of said rectangular base of the examination/treatment chair to locate the chair upon said base support.

4. The base support of claim 3 in which each of said locator plates are mounted to said top surface of said second plate directly above one of said wheel assemblies to protect said wheel assemblies from damage.

5. The base support of claim 3 in which each of said locator plates is formed with an angled edge adapted to engage the rectangular base of the examination/treatment chair.

6. The base support of claim 1 in which the examination/treatment chair has a generally circular base, said second plate including a pair of spaced mounting plates connected to said top surface thereof for mounting said guide plate to said second plate, said mounting plates being positioned on said top surface of said second plate to engage the circular base of the examination/treatment chair for properly locating the chair upon said base support.

7. The base support of claim 1 in which said locking pin is formed with substantially cylindrical ends for positive engagement with said cover plate and said first plate.

* * * * *